(12) United States Patent
Piekarz

(10) Patent No.: US 8,027,464 B2
(45) Date of Patent: Sep. 27, 2011

(54) HOLDING APPARATUS FOR ACCOMMODATING A MOBILE TELEPHONE

(75) Inventor: Roman Piekarz, Mielec (PL)

(73) Assignee: Bury Sp. z.o.o., Mielec (PL)

(*) Notice: Subject to any disclaimer, the term of this patent is extended or adjusted under 35 U.S.C. 154(b) by 845 days.

(21) Appl. No.: 11/720,557

(22) PCT Filed: Dec. 21, 2005

(86) PCT No.: PCT/EP2005/013769
§ 371 (c)(1),
(2), (4) Date: Apr. 4, 2008

(87) PCT Pub. No.: WO2006/066893
PCT Pub. Date: Jun. 29, 2006

(65) Prior Publication Data
US 2008/0207279 A1   Aug. 28, 2008

(30) Foreign Application Priority Data
Dec. 21, 2004  (DE) .................. 10 2004 062 177

(51) Int. Cl.
*H04M 1/00* (2006.01)
*H04M 9/00* (2006.01)
(52) U.S. Cl. .................. 379/455; 379/446; 379/449
(58) Field of Classification Search ................. 379/426, 379/436, 441, 446, 447, 449, 454, 455; 455/575.1; 248/592, 224.4, 225.2
See application file for complete search history.

(56) References Cited

U.S. PATENT DOCUMENTS 5,555,302 A * 9/1996 Wang .......................... 379/446
5,694,468 A * 12/1997 Hsu .............................. 379/446
5,703,946 A   12/1997 Chen ............................. 379/446
6,073,901 A    6/2000 Richter ....................... 248/316.4
2002/0159587 A1 * 10/2002 Chang ........................... 379/454

(Continued)

FOREIGN PATENT DOCUMENTS

DE    297 21 836 U1   12/1997

(Continued)

*Primary Examiner* — Tuan Nguyen
(74) *Attorney, Agent, or Firm* — Whitham Curtis Christofferson & Cook, PC

(57) ABSTRACT

The invention relates to a holding device provided with a receiving system for receiving a mobile telephone (30, 30'), said holding device comprising a housing (1). The receiving system is formed by at least two lateral jaws (3) projecting from a rear wall of the housing (1), at least one of said jaws being laterally displaceable and both of said jaws being provided with padding (5) that can be compressed by from lateral housing walls of the mobile telephone (30, 30'). The distance between the jaws (3) can be adjusted to the width of the mobile telephone (30, 30') by means of an adjusting device (11) provided in the rear wall (2). The adjusted jaws (3) remain fixed for the insertion and the removal of the mobile telephone (30, 30'), and the mobile telephone is fixed in the holder exclusively by means of a friction connection produced between the compressible padding (5, 6) and the mobile telephone (30, 30'). The aim of the invention is to create a universal holding device for different types of mobile telephones (30, 30'). To this end, the adjusting device (11) comprises a rotatably arranged plate (15) that is connected to the two jaws (3), and can be fixed in the rotary position thereof by means of a centrally arranged screw. The screw head (14) can be actuated on the rear wall (2) and covered by the inserted mobile telephone (30, 30').

8 Claims, 8 Drawing Sheets

U.S. PATENT DOCUMENTS

| | | | |
|---|---|---|---|
| 2002/0191782 A1* | 12/2002 | Beger et al. .................. | 379/454 |
| 2004/0063464 A1 | 4/2004 | Akram et al. ................ | 455/559 |

FOREIGN PATENT DOCUMENTS

| | | |
|---|---|---|
| DE | 19830270 | 3/1999 |
| DE | 19818827 | 11/1999 |
| DE | 10123556 | 12/2002 |
| DE | 20 2004 004005825 U | 6/2004 |
| WO | WO 00/27095 | 5/2000 |

* cited by examiner

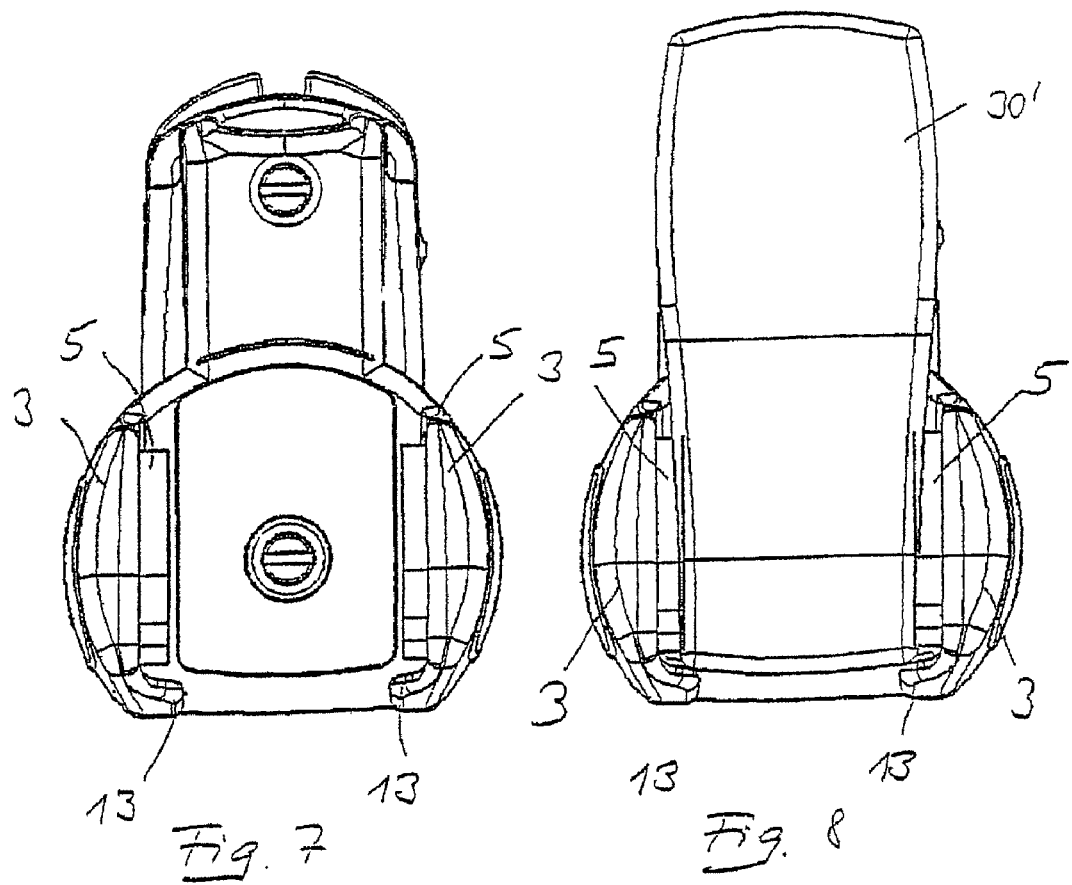

HOLDING APPARATUS FOR ACCOMMODATING A MOBILE TELEPHONE

The invention relates to a holding apparatus having an accommodating device for accommodating a mobile telephone and comprising a housing, with the accommodating device being formed by at least two side jaws which protrude from a rear wall of the housing and of which at least one can be moved sideways and which are provided with cushions which can be pushed in by side housing walls of the mobile telephone, it being possible to adjust the distance between the jaws to a width of a mobile telephone by means of an adjusting device which is provided in the rear wall, the adjusted jaws remaining fixed in position for the insertion and the removal of the mobile telephone and only a frictional connection, which is produced with the cushions which can be pushed in, to the mobile telephone being provided in order to fix the mobile telephone in the holding means.

Holding apparatuses of this type are used to combine the advantages of small, easy-to-handle and portable mobile telephones with the convenience functions of a permanently installed telephone system. For example, it may be desirable to use a telephone at a workstation without having to hold a receiver or the mobile telephone, in order, for example, to be able to operate a computer at the same time. Holding apparatuses of this type are particularly important when using the telephone in motor vehicles while driving. Since the driver needs both hands to control the motor vehicle, hands-free apparatuses are required in motor vehicles in order to enable the driver to use the telephone while driving. In addition, the mobile telephone has no or only little reception in the interior of the metal motor-vehicle body, with the result that the telephone systems in the motor vehicle transmit reception signals from an external antenna to the mobile telephone.

Mobile telephones are supplied by various manufacturers in different sizes and with different electrical connections. Designers of a holding apparatus are therefore faced with the problem of the holding apparatus having to be suitable for mechanically holding the specific mobile telephone in a reliable manner such that the mobile telephone remains in the holding apparatus as far as possible and the occupants are not put at risk, even in the event of the motor vehicle being involved in an accident. Furthermore, the electrical connection is often made for the specific mobile telephone.

If the mobile telephones are inserted into the holding apparatuses and intended to remain there for a relatively long period of time, it is necessary to ensure that it is possible to charge the mobile telephone.

The development of mobile telephones is proceeding in an accelerated manner, with the result that, for example, the service life of a motor vehicle may last longer than the service life of a mobile telephone. Furthermore, a plurality of users of a motor vehicle may have different mobile telephones, and it should be possible to operate these different mobile telephones in the motor vehicle. In order to make this possible, the basic installation of the telephone system into the motor vehicle has to be universal, that is to say independent of the specific type of mobile telephone, in order to ensure hands-free operation, to transmit the signals from the external antenna and to provide the supply voltage. It is therefore known to install a base unit in the motor vehicle, which base unit ensures the universal functions. The base unit is connected to a holding means which is permanently fitted at a suitable location in the motor vehicle. This holding means can be used together with a holding shell which is specifically designed for the mobile telephone and which mechanically holds the specific mobile telephone and produces an electrical connection to the specific connection configuration of the mobile telephone. The holding shell has a standard connection for electrical connection to the holding means. It is known to also equip the holding shell with a control device for charging the specific mobile telephone, with the supply voltage being conducted to the holding shell from the base unit via the holding means.

These known systems have the advantage that the base unit and the holding means can be used universally and that only a corresponding holding shell is required in order to adapt the specific mobile telephone. If the holding shell is available, the corresponding mobile telephone can be used in the vehicle in question. Since the holding shell is fastened to the holding means in an easily exchangeable manner, different mobile telephones can be used in the motor vehicle together with the associated holding shells.

Mobile telephones which are provided with a device for the wireless transmission of data and voice signals have been available for some time. Mobile telephones of this type permit regular communication with a computer, with the result that it is possible, for example, to use said mobile telephones to access the Internet given a suitable infrastructure. Furthermore, mobile telephones of this type permit the use of wireless speech devices with headsets and microphones for hands-free telephony. In this case, radio transmission of the control and voice signals is predominantly performed using the Bluetooth standard. It goes without saying that telephones of this type with suitable holding shells are also used in the known systems in a virtually stationary manner.

The object of the present invention is to make a holding apparatus of the type mentioned in the introduction even more simple and convenient.

In order to achieve this object, the holding apparatus of the type mentioned in the introduction is, according to the invention, characterized in that the adjusting apparatus has a rotatably arranged plate which is connected to the two jaws, and in that the plate can be fixed in its rotary position by means of a screw which is arranged centrally and whose screw head can be operated on the rear wall and is covered by an inserted mobile telephone.

The holding apparatus according to the invention is designed to accommodate different mobile telephones by the accommodating device being adjusted in a corresponding manner. Consequently, the invention does not require the use of a holding shell which is specific to the mobile telephone and which mechanically and electrically adapts said holding apparatus to the specific mobile telephone. The basis here is the knowledge that communication with the base unit can be performed by means of the device for wireless transmission (Bluetooth device), it naturally being necessary for a corresponding device which communicates with the base unit to be available. This device may therefore be provided in the base unit but, according to the invention, is preferably arranged in the holding apparatus. This has the advantage that the base unit can be designed independently of whether the holding apparatus is used in the conventional manner with holding shells without utilizing a Bluetooth function or whether, in accordance with the invention, a universal holding apparatus utilizing the Bluetooth function is implemented. The invention provides that the distance between the jaws can be adjusted to a width of a mobile telephone by means of an adjusting device which is provided in the rear wall and covered by an inserted mobile telephone, in that the adjusted jaws remain fixed in position for the insertion and the removal of the mobile telephone, and in that only a frictional connection, which is produced with the cushions which can be pushed in, to the mobile telephone is provided in order to fix the mobile telephone in the holding means. The jaws are therefore adjusted for the mobile telephone once and this position is then maintained, it being possible to fix the mobile telephone by pushing it into the cushions and also to withdraw it from the cushions again. At least one of the side jaws can expediently have a projection for engaging beneath a lower housing wall of the mobile telephone. However, a projection of this type can also be provided on the rear wall of the housing of the holding apparatus.

For small mobile telephones, clamping by the side jaws and support from below is sufficient to fix said mobile telephones in the holding apparatus. For larger mobile telephones, it is expedient to provide an upper jaw which protrudes from the rear wall, can be moved perpendicular to the side jaws, can be set for a length of a mobile telephone, and has a cushion which can be pushed in by an upper housing wall of the mobile telephone. As a result, clamping-type holding is effected not only in the horizontal direction but also in the vertical direction, and this makes fixing of, in particular, larger mobile telephones more secure.

In the case of the holding apparatus according to the invention, the accommodating device for the mobile telephone can be provided with a holding plate which is to be firmly attached to the motor vehicle and to which the accommodating device can be fastened in a latching manner. In this case, an electrical connection can be made between the holding plate and the accommodating device by two corresponding plug parts engaging one in the other as part of the latching connection. In this case, it is possible for the holding plate to form the electrical output of the holding apparatus to which the cable can be connected, said cable establishing the connection to the mobile telephone with its other end.

The holding apparatus according to the invention is of universal design. In this case, provision may be made for the charging operation, which requires a specific charging control means since different mobile telephones have to be charged with different charging voltages, charging currents and possibly charging programs, to be performed in a separate charging station. However, the holding apparatus preferably provides a supply power for charging purposes at its output. A specific charging cable can then be used to charge the mobile telephone, it being possible to connect said charging cable to the (not specific) output of the holding apparatus with one end and to the (specific) charging input of the mobile telephone with the other end. The charging cable contains the control device which generates the charging parameters (charging voltage, charging current, possibly time profile) which is required for the specific mobile telephone from the supply voltage which is provided at the output of the holding apparatus. The holding apparatus, including its charging output, is accordingly of universal design and is adapted to the specific mobile telephone solely by mans of the charging cable which belongs to the holding apparatus.

It is also possible to provide the holding apparatus with a universal antenna which can be coupled to an external antenna and which conducts the electromagnetic field received from the external antenna to the interior of the vehicle and to the vicinity of the receiving antenna of the mobile telephone, with the result that reliable reception with the receiving antenna of the mobile telephone is also possible in the interior of the motor vehicle. An antenna arrangement of this type is already formed in the holding apparatus by providing a metal plate which is connected to an antenna cable in the holding apparatus. In this case, the metal plate can expediently be arranged in the holding plate of the holding apparatus.

The invention will be explained in greater detail below with reference to exemplary embodiments which are illustrated in the drawing, in which:

FIG. 7 shows a view of the holding apparatus according to FIG. 1 without a vertical jaw;

FIG. 8 shows a view of the holding apparatus according to FIG. 7 with a (small) mobile telephone inserted.

Figure 1:
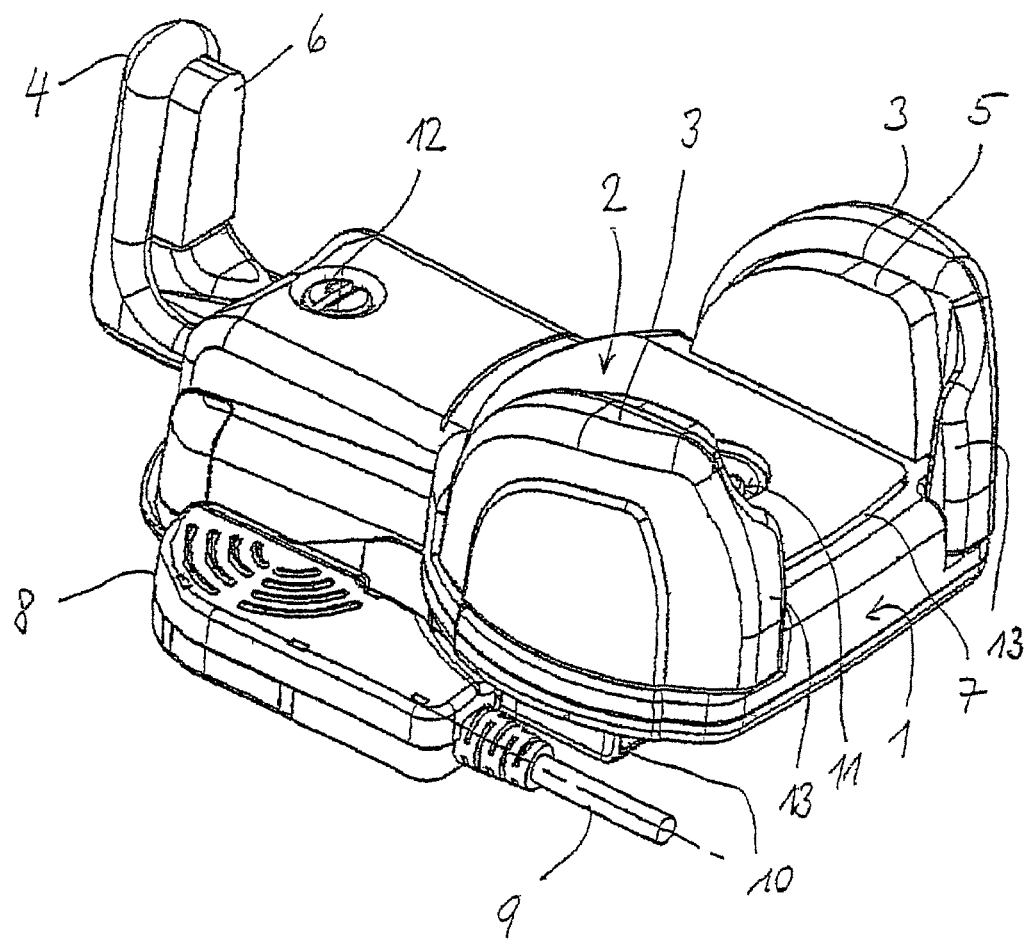
FIG. 1 shows a perspective illustration of a holding apparatus according to the invention.

FIG. 1 shows that the holding apparatus has a housing 1 which forms a rear wall 2 for an accommodating device which is formed from two side jaws 3, which protrude from the rear wall 2, and a vertical jaw 4 which can be moved perpendicular to said side jaws. On the sides which point toward one another, the side jaws 3 are each provided with a flat cushion 5 composed of a medium-hard elastic plastic. A corresponding cushion 6 is fitted to the vertical jaw 4. The rear wall 2 is provided with a flat cushion support 7 between the side jaws 3. In this case, the cushions 5, 6 have a thickness of 3 to 7 mm, preferably 5 mm, and the cushion support has a thickness of 1 to 4 mm, preferably 2 mm. The housing is of closed design beneath the rear wall 2 and is equipped on one longitudinal side with a connection for a cable plug 8 of a charging cable 9. Beneath the side jaws 3, the housing 1 ends with a plug connector 10 with which the holding apparatus according to FIG. 1 can be pushed onto a holding means in the motor vehicle in order to thus produce an electrical connection with a base unit which is installed in the vehicle.

FIG. 1 also shows that an adjusting device 11 is provided between the side jaws 3 on the rear wall 2 and, furthermore, an adjusting device 12 is likewise provided in the rear wall 2 in the vicinity of the vertical jaw 4.

At their end facing away from the vertical jaw 4, the side jaws 3 have a bent-over projection 13, which projections together form a mating bearing for the vertical jaw 4 and a rest for a mobile telephone which has been inserted into the holding apparatus such that it is upright, as explained in greater detail with reference to FIGS. 6 and 8.

Figure 2:
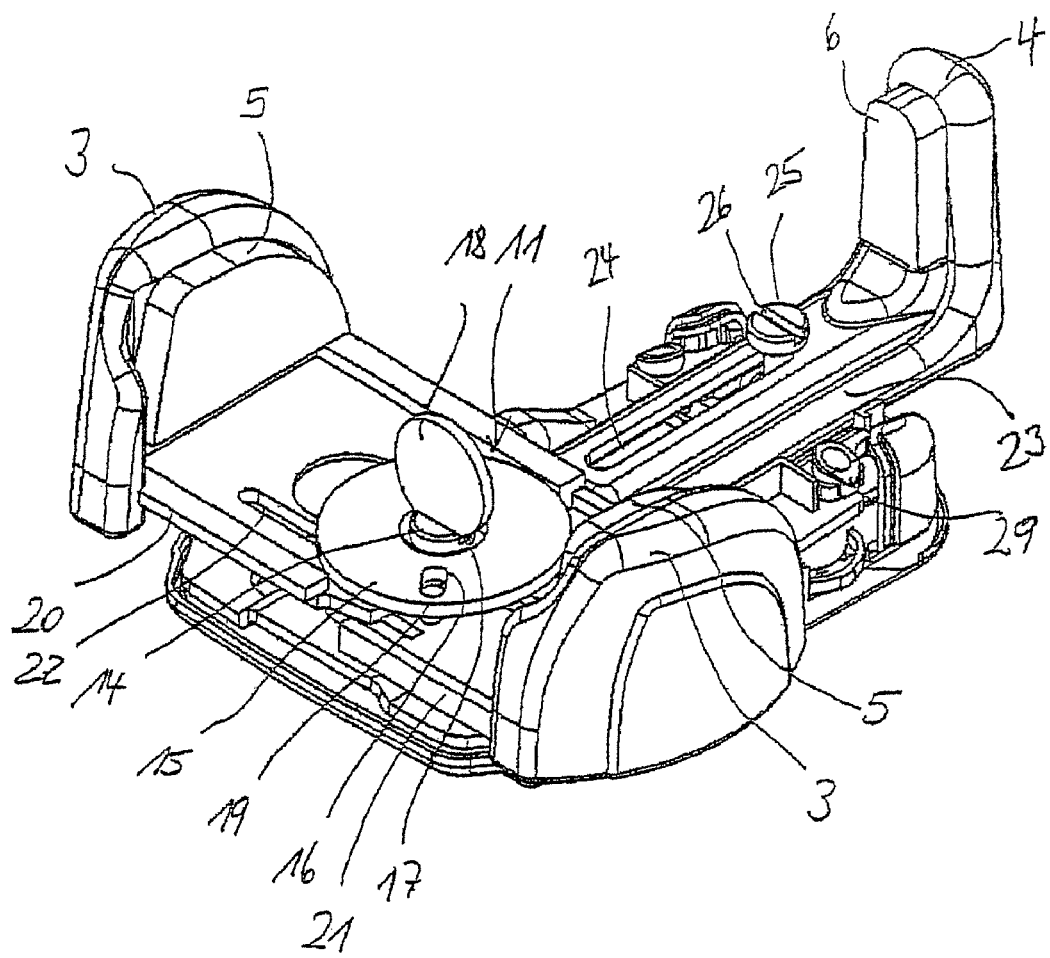
FIG. 2 shows a perspective illustration of the holding apparatus according to FIG. 1 without covering plates, in order to describe adjustment mechanisms.

FIG. 2 shows the adjustment mechanisms for the side jaws 3 on the one hand and for the vertical jaw 4 on the other hand, since the holding apparatus is illustrated with cover plates removed.

The adjusting device 11 for the side jaws 3 has a round plate 15 on which two radially oriented elongate holes 16 are located diametrically opposite one another. A screw head 14 of a screw which protrudes through the plate 15 is provided with a longitudinal slot 17 into which a coin 18 can be inserted in order to fix the plate 15 in its position by rotating the screw head 14. A pin 19 protrudes into each of the elongate holes 16.

The side jaws 3 are each connected, preferably integrally, to plates 20, 21 which run beneath and parallel to the disk 15, and whose length is greater than half the maximum distance between the side jaws 3, with the result that the plates 20, 21 overlap in the center of the holding apparatus even when the distance between the side jaws 3 is at a maximum, that is to say they are guided one over another. The two plates are each fitted with one of the pins 19 which protrude into the elongate holes 16. The upper plate 20 is provided with a longitudinal slot 22 which is open toward the free end and through which the pin 19 of the lower plate can project as far as the elongate hole 16 when the side jaws are moved toward one another.

In the position illustrated in FIG. 2, the side jaws 3 are at the greatest possible distance from one another. As a result of movement of the side jaws 3 toward one another, the pins 19 which are arranged diametrically opposite the center point of the disk 15 are moved linearly on account of corresponding guidance of the plates 20, 21 and in the process rotate the plate 15 when the screw head 14 is loosened. Once a distance which is suitable for a specific mobile telephone has been set between the side jaws 3, the position of the plate 15 is fixed by means of the coin 18 and the screw head 14. It is then no longer possible to adjust the side jaws 3, unless the screw head 14 is loosened again.

The vertical jaw 4 has a rear longitudinal projection 23 which is provided with a longitudinal slot 24. A screw protrudes through the longitudinal slot 24 and has a screw head 25 whose diameter is larger than the width of the longitudinal slot 24. The screw head 25 is provided with an operating slot 26 which is likewise suitable for receiving a coin 18.

Figure 3:
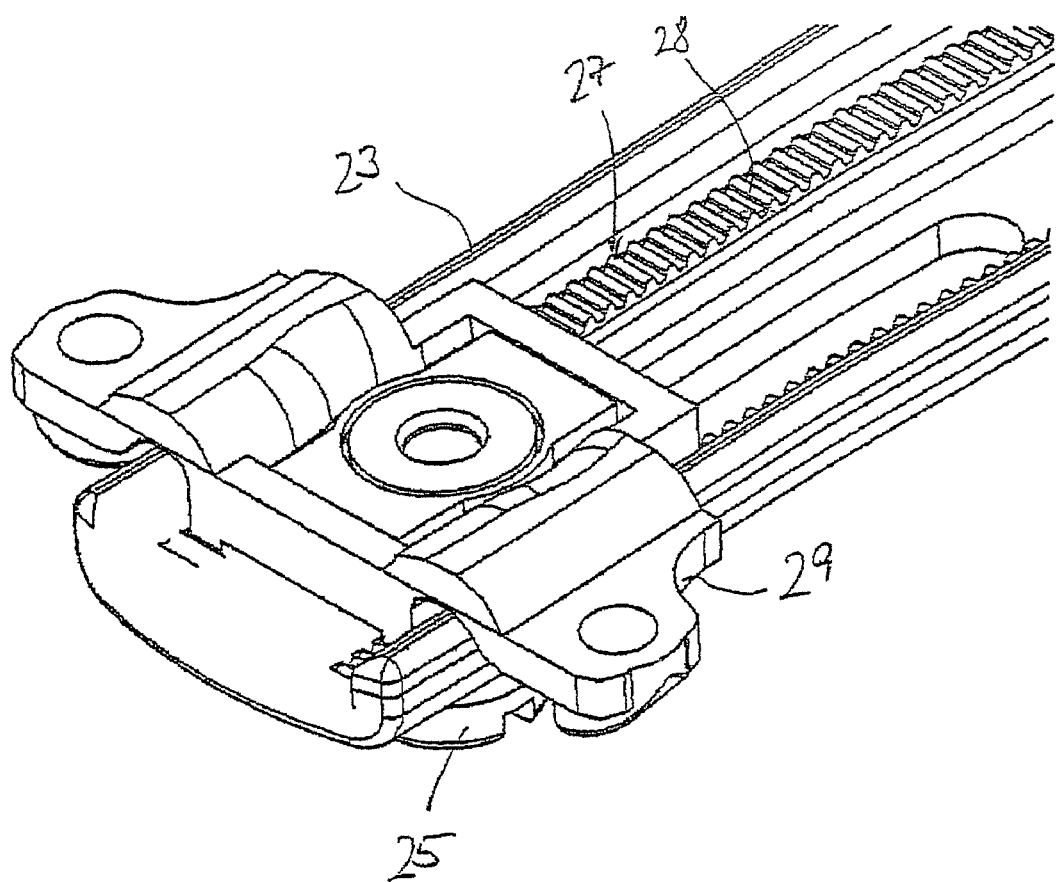
FIG. 3 shows a perspective illustration of a detail of an adjustment device.

FIG. 3 shows a perspective view of the lower face of the elongate projection 23 and shows that the lower face of said elongate projection is provided with two rails 27 on which a tooth system 28 with teeth oriented transverse to the longitudinal axis is located. A slide 29 is guided beneath the projection 23 by the screw head 25 via a threaded bolt (not illustrated) and has a tooth system (not illustrated) which corresponds to the tooth system 28 on its surface which projects upward. An intermediate space between the tooth system 28 and the tooth system of the slide 29 is produced by loosening the screw head 25, with the result that the projection 23 can be adjusted in the longitudinal direction relative to the slide 29 which is arranged such that it is stationary. The slide 29 is drawn toward the tooth system 28 of the projection 23 by tightening the screw which is connected to the screw head 25, as a result of which the two tooth systems engage one in the other such that the vertical jaw 4 is fixed in a defined position.

Figure 4:
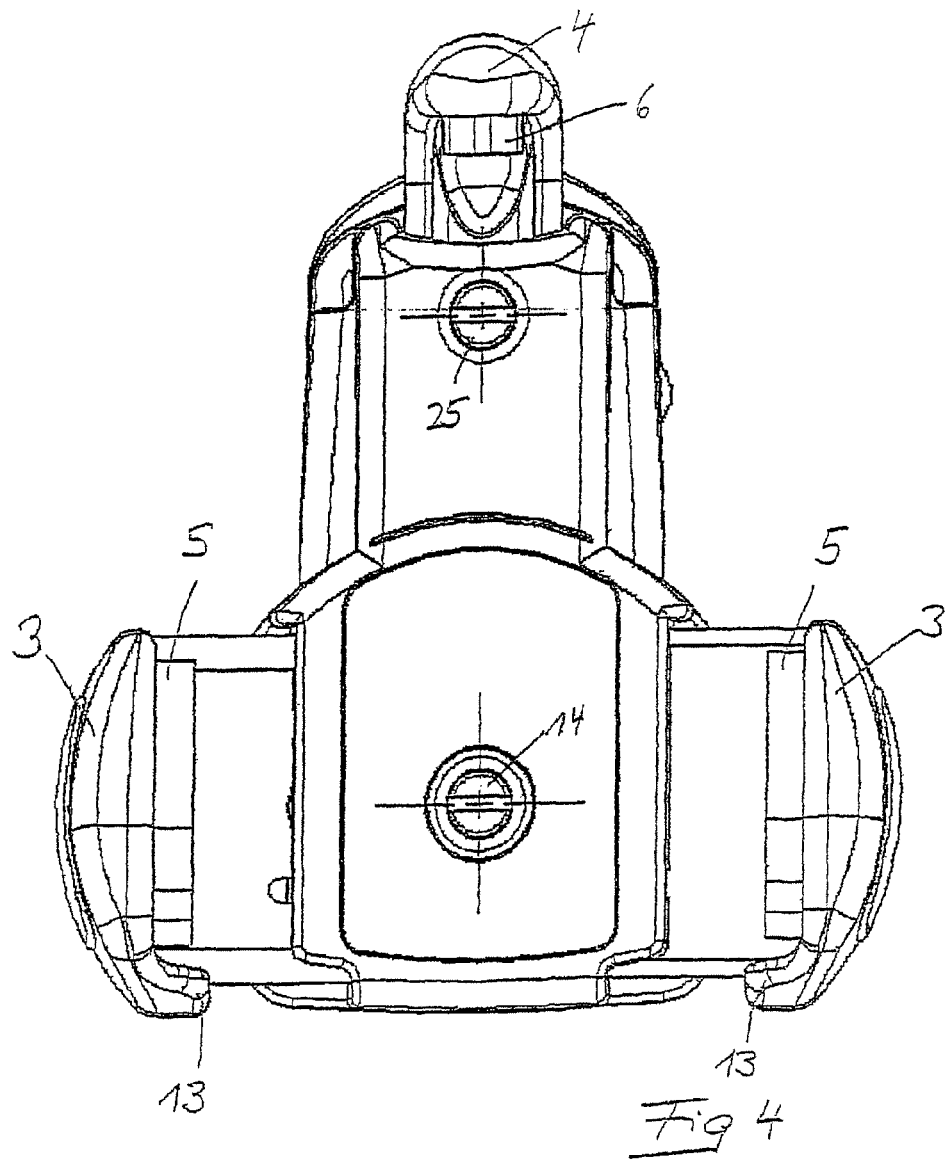
FIG. 4 shows a view of the holding apparatus according to FIG. 1 with the side jaws spread apart from one another.
Figure 5:
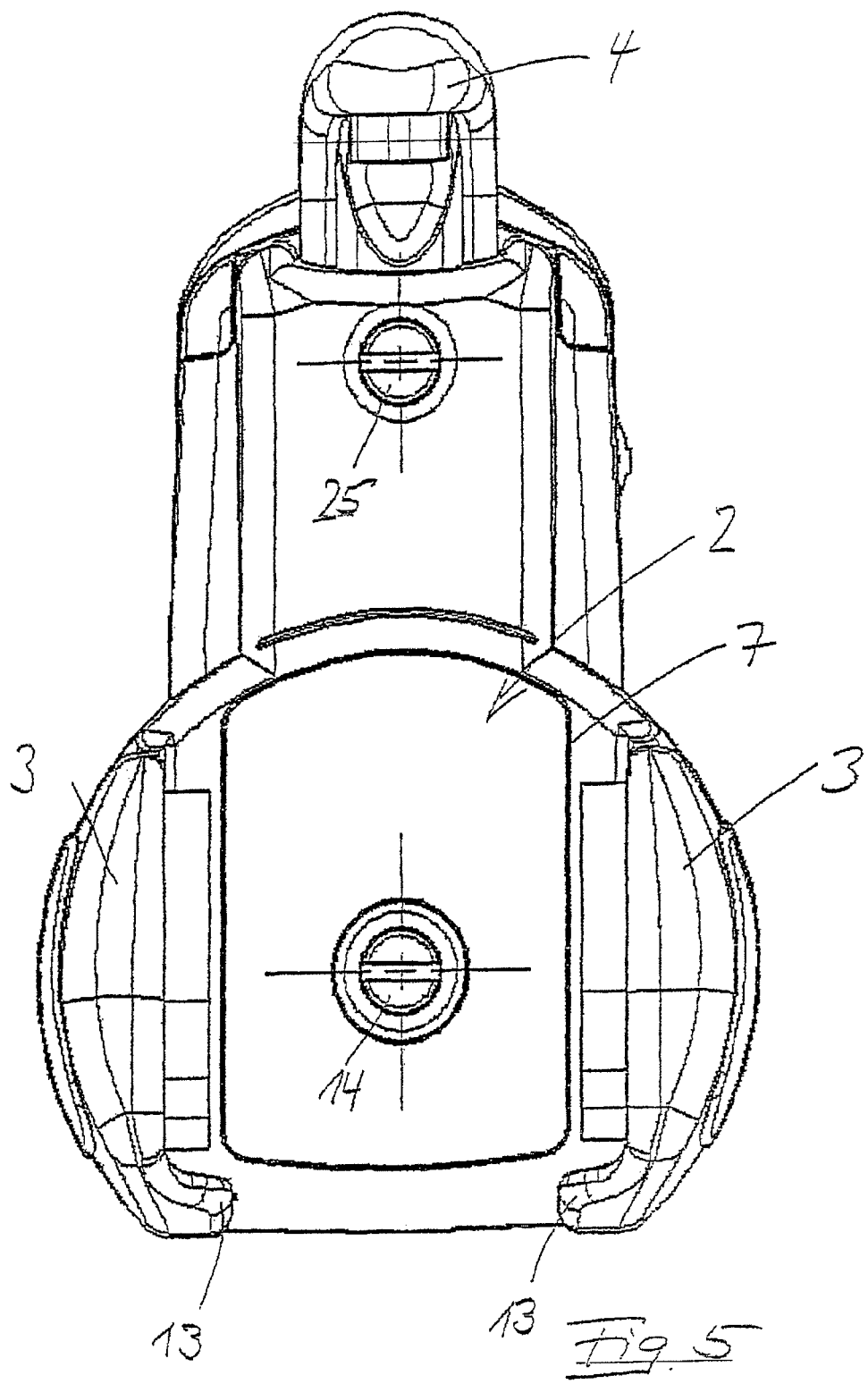
FIG. 5 shows a view according to FIG. 4 with adjustment of the jaws which are set for use with a particular mobile telephone.

FIG. 4 shows a view of the holding apparatus according to FIG. 1 with the side jaws 3 in a position in which they are at a maximum distance from one another. After the screw head 14 is loosened, the side jaws 3 can be moved toward one another in order to reach a position, as illustrated in FIG. 5, which is suitable for a specific mobile telephone. Said side jaws are fixed in this position by turning the screw head 14. The distance between the vertical jaw 4 and the projections 13 of the side jaws 3 is adjusted by loosening the tooth system with the aid of the screw head 25 such that said distance corresponds to the length of the specific mobile telephone. The screw head 25 is then tightened again in order to produce the locking between the tooth system 28 and the mating tooth system.

Figure 6:
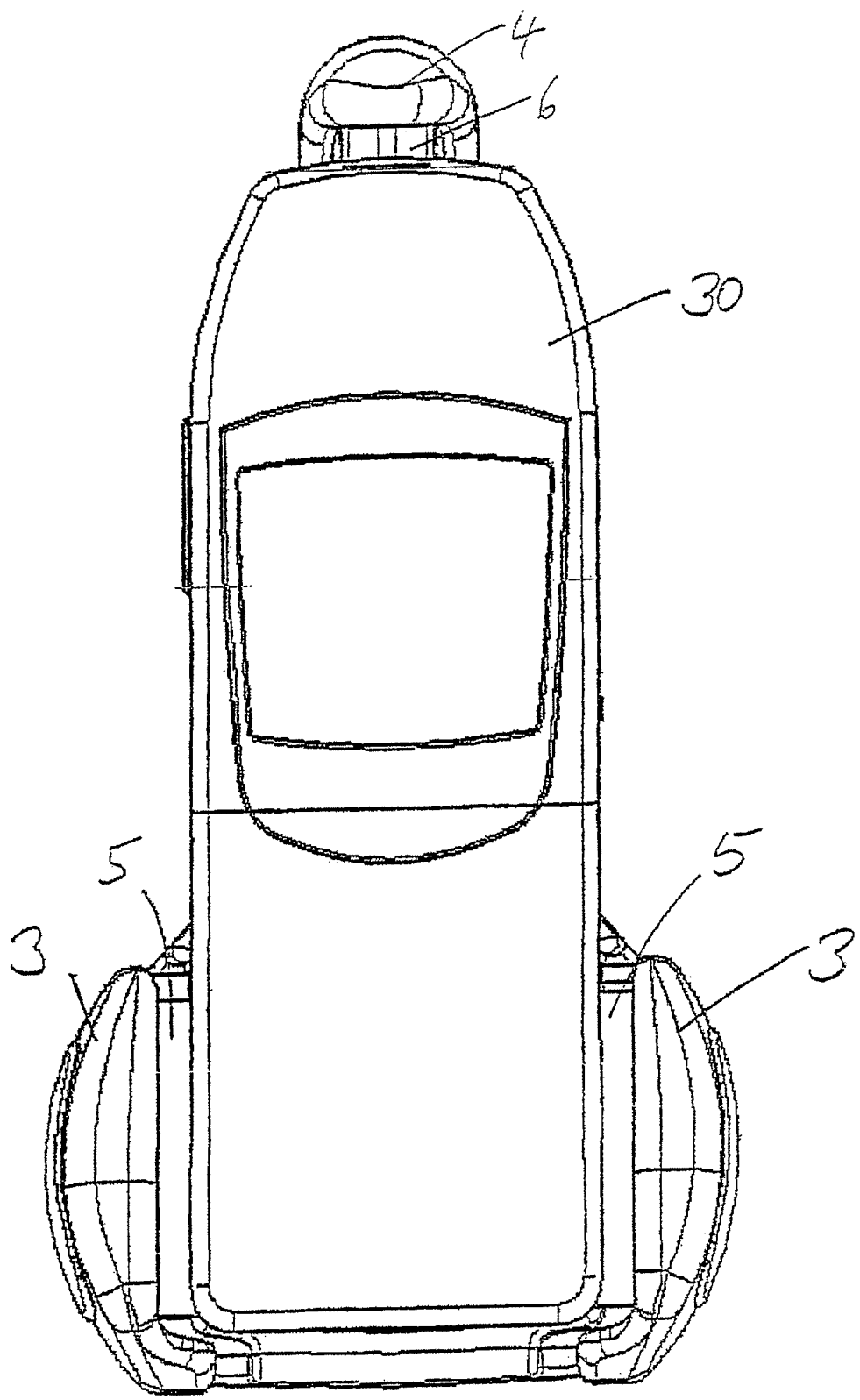
FIG. 6 shows a view of the holding apparatus according to FIG. 5 with the mobile telephone inserted.

FIG. 6 shows that a specific mobile telephone 30 can be inserted into the holding apparatus which is adjusted in this way as a result of said mobile telephone being inserted in a clamping manner into the holding means, that is to say between the jaws 3 and 4, in the direction of and parallel to the rear wall 2, with the corresponding side walls of the mobile telephone 30 elastically deforming the cushions 5, 6 and thus producing a strong frictional connection between the corresponding side walls of the mobile telephone 30 and the cushions 5, 6. This frictional connection is sufficient to fix the mobile telephone 30 in the holding apparatus such that all requirements are met.

FIG. 7 shows a view of the holding apparatus in which the vertical jaw 4 with the projection 23 has been removed since a smaller mobile telephone 30' is to be accommodated. In order to hold this smaller mobile telephone 30', it is sufficient to clamp said small mobile telephone between the side jaws 3 by means of the cushions 5 and to support it on the lower face with the projections 13.

The low height and the low weight of the mobile telephone 30' mean there is no risk of the mobile telephone 30' being levered out of being held in a clamping manner between the side jaws 3 on account of forces of inertia.

Figure 9:
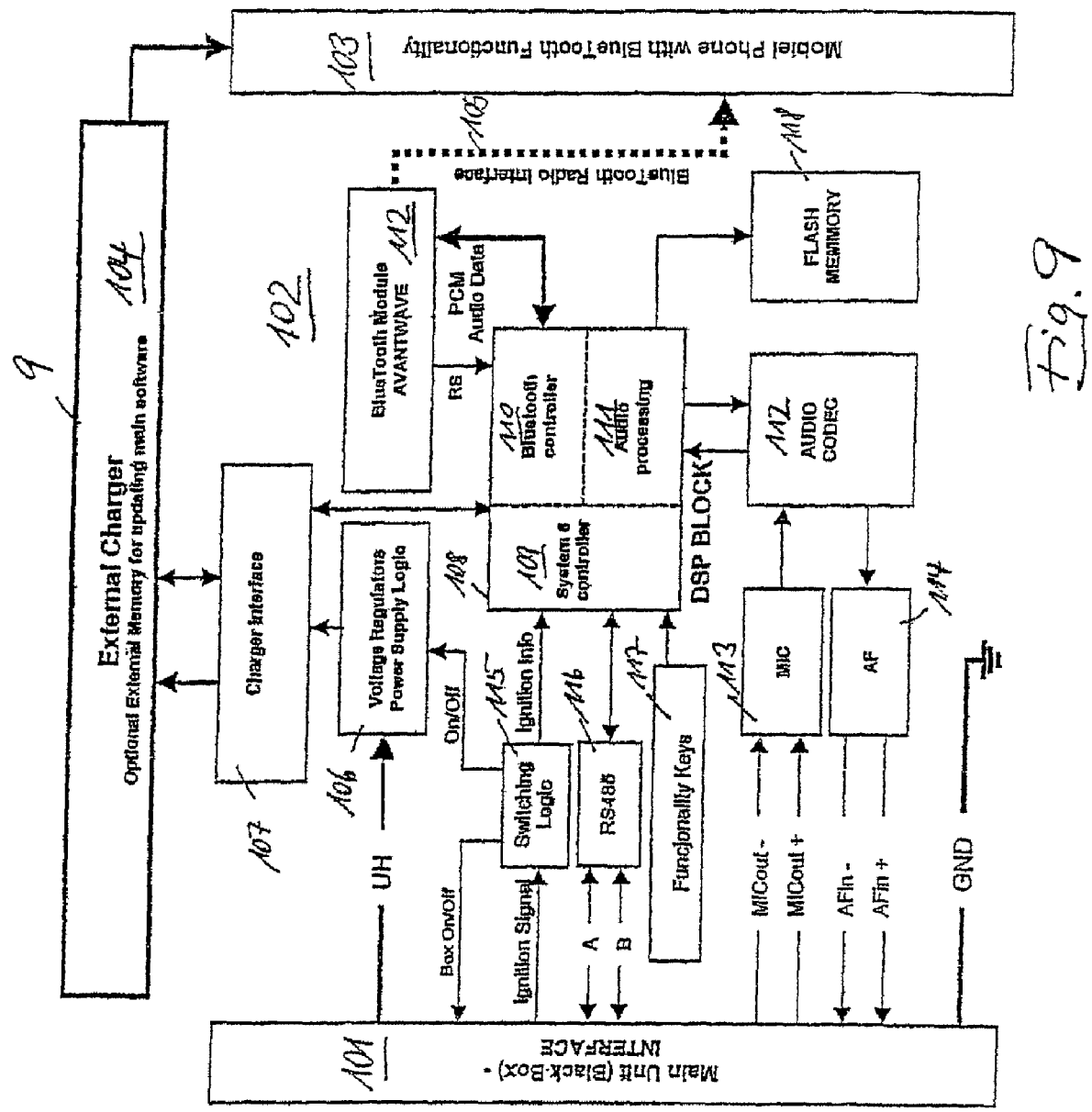
FIG. 9 shows a block diagram of the circuitry of the holding apparatus according to an exemplary embodiment in which the holding apparatus is provided with a Bluetooth device.

The block diagram illustrated in FIG. 9 shows the functional incorporation of the holding apparatus into a stationary telephone system. Said system has a base unit 101 which, for example, can be connected to an external antenna and can be connected to a microphone and a loudspeaker of a hands-free device. The base unit 101 is connected to the circuit arrangement 102 in the holding apparatus by means of a suitable interface which can be formed by a holding means in the motor vehicle but also by a cable. The circuit arrangement 102 of the holding apparatus is connected to a mobile telephone 103 by means of a charging device 104 which is accommodated in the charging cable 9.

A functional but wireless connection 105 is made via radio signals in the Bluetooth standard.

The base unit 101 supplies the circuit arrangement 102 with a supply voltage UH which arrives at a voltage regulation circuit 106 whose output voltage is conducted to the external charging device 104 in the charging cable 9 via a charging interface 107.

A central control block 108 contains a system control means 109, a Bluetooth control means 110 and an audio signal processing stage 111. The Bluetooth control means together with a Bluetooth module 112 effect communication with the corresponding Bluetooth module of the mobile telephone 103 via the wireless communication connection 105.

FIG. 9 shows that the system control means 109 can communicate with the charging interface 107. As a result, it is possible to install updates for the software of the system control means 109 via the charging interface 107.

The audio signal processing stage 111 is connected via an audio coder/decoder 112 to a processing stage 113 for a signal which is received by a microphone and a processing stage 114 for audio signals to be played back via a loudspeaker. The processing stages 113, 114 are connected to the interface to the base unit 101.

A switching logic 115 permits the voltage regulation means 106 and the system controller 109 to be switched on on the basis of a switch-on signal from the base unit 101. Conversely, the switching logic can also switch on and switch off the base unit 101.

A serial interface 116 is also provided, with which system control functions can be interchanged between the system control means 109 and the base unit 101.

The holding apparatus can be provided with adjusting devices with which, for example, the volume of playback through the loudspeakers can be adjusted.

FIG. 9 also shows an external memory 118 for the central control block. Furthermore, a common ground connection to the holding apparatus is produced by means of the base unit.

The circuit arrangement 102 shows the concept according to the invention of controlling the mobile telephone via the Bluetooth connection 105 and only performing charging control specifically for the mobile telephone 103, with the charging control means not, however, being arranged in the circuit arrangement 102 but being arranged in the charging cable as an external charging control means 104.

The invention claimed is:

1. A holding apparatus having an accommodating device for accommodating a mobile telephone (30, 30') and comprising a housing (1), with the accommodating device being formed by at least two side jaws (3) which protrude from a rear wall of the housing (1) and of which at least one can be moved sideways and which are provided with cushions (5) which can be pushed in by side housing walls of the mobile telephone (30, 30'), it being possible to adjust the distance between the jaws (3) to a width of a mobile telephone (30, 30') by means of an adjusting device (11) which is provided in the rear wall (2), the adjusted jaws (3) remaining fixed in position for the insertion and the removal of the mobile telephone (30, 30') and only a frictional connection, which is produced with the cushions (5, 6) which can be pushed in, to the mobile telephone (30, 30') being provided in order to fix the mobile telephone in a holding means, characterized in that an adjusting apparatus (11) has a rotatably arranged plate (15) which is connected to the two jaws (3), and in that the plate can be fixed in its rotary position by means of a screw which is arranged centrally and whose screw head (14) can be operated on the rear wall (2) and is covered by an inserted mobile telephone (30, 30').

2. The holding apparatus as claimed in claim 1, characterized in that at least one of the side jaws (3) has a projection (13) for engaging beneath a lower housing wall of the mobile telephone (30, 30').

3. The holding apparatus as claimed in claim 1, characterized by an upper jaw (4) which protrudes from the rear wall (2), can be moved perpendicular to the side jaws (3), can be set for a length of a mobile telephone (30, 30') by an adjusting device (12), and has a cushion (6) which can be pushed in by an upper housing wall of the mobile telephone (30, 30').

4. The holding apparatus as claimed in claim 1, characterized in that the holding apparatus has an interface for a hands-free device and a device for controlling the charging of a battery of the mobile telephone (30, 30') and an electrical output at which a an electrical power which can be used for charging purposes is produced, and in that the device for controlling charging is arranged in a cable (9) which is specific to the mobile telephone (30, 30') and can be connected to the output with one end and can be connected to the mobile telephone (30, 30') with the other end.

5. The holding apparatus as claimed in claim 4, characterized in that a device (112) for the wireless communication of data and voice signals to the mobile telephone (103) is arranged in the housing (1).

6. The holding apparatus as claimed in claim 1, characterized by a metal antenna arrangement, which is arranged in the holding apparatus and can be connected to an external antenna, for transmitting the received electromagnetic field to a receiving antenna of the mobile telephone (30, 30').

7. The holding apparatus as claimed in claim 1, characterized in that the mobile telephone (30, 30') is provided with a device for the wireless transmission of data and voice signals.

8. The holding apparatus as claimed in claim 1, characterized in that the rotatably arranged plate (15) is connected to the two jaws (3) in each case by means of a pin (19) which protrudes into an elongate hole (16).

\* \* \* \* \*